United States Patent Office 3,728,279
Patented Apr. 17, 1973

3,728,279
METHOD AND COMPOSITION FOR THE EMULSI-
FICATION AND THE DEGRADATION OF PETRO-
LEUM PRODUCTS AND FERTILIZERS THUS
OBTAINED
Georges Henri Salomone, 14 Avenue Pierre ler de Serbie,
Paris, France
No Drawing. Filed Jan. 29, 1971, Ser. No. 111,105
Claims priority, application France, Feb. 3, 1970,
7003764
Int. Cl. B01j 13/00
U.S. Cl. 252—312
2 Claims

ABSTRACT OF THE DISCLOSURE

Petroleum products are rendered bio-degradable to produce fertilizer, by admixing therewith, per 100 parts by weight of petroleum product, 50 to 250 parts by weight of a mixture which is 15 to 80 parts by weight of a carbohydrate or protein nutrient for microorganisms, 10 to 50 parts by weight of a surface-active agent that reduces the surface tension, and a diluent which may be either 5 to 60 parts by weight of water, or 150 to 400% by weight of the total weight of the substance in the form of an absorbent powder.

---

The present invention concerns a method and a composition for the emulsification and the degradation of petroleum products and the fertilizers thus obtained.

The sludges and deposits coming from crude oils and their derivatives pose important and serious technical and economic problems. These sludges and deposits fluidify only with difficulty in steam and this operation requires a considerable amount of manual labour with high prime costs. The use of solvents and the rejection of the sludges fluidified in steam causes unceasing pollution of water with harmful effects on the flora and fauna by virtue of the very slow rate of degradation of the said hydrocarbons.

In the U.S. Pat. No. 3,609,096 a product was proposed which is constituted by a strong mineral acid, an alkaline or alkaline-earth salt and an organic hydrophile substance, particularly molasses. This product contains from 30 to 70% by weight of a strong mineral acid and it has a strongly acid pH which does not exceed 1.8. The diluted emulsion obtained with the known product is not toxic to flora and fauna but a new composition, according to the invention, has been discovered, which permits not only the emulsification of petroleum products but further to valorise them by transforming them into fertilizer or in culture media for micro-organisms.

The aim of the invention is to make petroleum wastes of all kinds undergo a treatment transforming them into a culture medium for micro-organisms so as to permit their rapid degradation by the latter, the degradation giving rise to fertilizing products.

It has as its subject a composition to emulsify and transform into a culture medium for micro-organisms petroleum products which is constituted by a mixture of a substance being capable of ensuring the nutrition of the micro-organisms said substance being chosen from carbohydartes and proteins, of a substance reducing surface tension to permit the mixture with hydrocarbons said substance being chosen from alkaline or alkaline-earth silicates, carbonates, phosphates, phosphites and hypophosphites and a diluting medium.

The percentage of the substance ensuring the nutrition of the micro-organisms and the substance reducing surface tension can vary as a function of their nutritional value and the specific activity of the substances used.

The diluting medium can be water and the amount of water may vary according to whether a fluid or pasty composition is sought and according to the physical nature the substances used.

For same purposes more particularly to convert into a culture medium bio-degradable by micro-organisms the petroleum products in the form of overfloating layers, it is requested to have a product on a powdery form. In such a case the diluting medium is an absorbing powder chosen amongst calcium carbonate and talcum powder. The amount of absorbing powder may vary according to the physical nature of the other substances.

In a general way the composition which is the subject of the invention corresponds to the following composition limits:

| | Parts by weight |
|---|---|
| Substance ensuring the nutrition of the micro-organisms | 15 to 80 |
| Substance reducing the surface tension | 10 to 50 |
| Water | 5 to 60 |

When the diluting medium is an absorbing powder, this one may be present at a rate of 150 to 400% by weight of the total weight of the substance ensuring the nutrition of the micro-organisms and of the substance reducing surface tension.

As to the difference of the product, which is the subject of the patent mentioned hereinabove, the composition in accordance with the invention has a basic pH.

Carbohydrates and proteins alone or in a mixture such as of molasses, cellulose, sugar beet waste, casein, malt extracts, proteoses, etc., can be used as the substance capable of ensuring the nutrition of the micro-organisms.

A part of these substances ensuring the nutrition is preferably substituted by a nitrogen source chosen amongst the ammonium salts, the amines, the amides such as urea or the natural products such as washes, i.e., the residuary liquor obtained when distilling fermentated molasses in alcohol manufacture.

The substance reducing surface tension must be an alkaline or alkaline-earth, non-toxic silicate, carbonate, phosphate, phosphite or hypophosphite, used on ts own or in a mixture. Particularly calcium, sodium and potassium silicate, calcium, sodium, potassium and ammonium carbonate, dibasic sodium phosphate, and dicalcium phosphate and mono- or dibasic ammonium phosphate can be used.

When an absorbing mineral filler is used in order to obtain a powdery composition, it is better, to increase the oleophilic nature of the said compositon and facilitate its mixing with petroleum to add a fatty acid in an amount equal to 10 to 30% in weght of the absorbing powder weight. The fatty acid may be any one of the stearic, oleic and palmitic acids.

It is also possible to supplement the composition with the oligo-elements necessary for the micro-organisms growth such as potassium, iron, zinc, magnesium and manganese salts.

The subject of the present invention is also a method of emulsifying petroleum wastes and of ensuring the formation of a culture medium for micro-organisms in which there are mixed, by mechanical agitation, to 100 parts by weight of the said wastes, from 50 to 250 parts by weight of a composition such as the one given above and then this is diluted with water. The dilution water can be fresh, brackish or sea water. The dilution ratio is variable and can be established between 5 and 40 times.

The emulsion obtained in itself constitutes a fertilizer but the fertilizing quality being obtained only after the degradation of the hydrocarbons, the sols can be used only after a period of 6 to 12 months.

In order to obtain a fertilizer which allows the treated sols to be used immediately, the preparation is stocked in the greatly diluted state while contigently inoculating it with micro-organisms and the progress of the degradation is checked by chromatography in the gaseous phase. It is also possible, in order to assist the development of certain micro-organisms, to modify in advance the pH of the dilution by the addition in small amounts of a mineral or organic acid. When the degradation is complete, after a period of from three to six weeks, the aqueous suspension can be poured onto the sols. The suspension can also be concentrated by evaporation of the water. The degradation can also be halted by violent modification of the pH for example by addition of a strong acid.

The above mentioned fertilizers can contingently be made up as a function of the deficiencies of the sol, by addition of other elements such as potash, phosphates, sulphates, nitrates, etc. In so far as they are not harmful to the development of the micro-organisms ensuring the degradation, these elements can be added at any stage whatever, that is to say to the emulsifying composition or to the emulsion constituting the culture medium.

The emulsions constituting the culture media for the micro-organisms, they can also be used as culture media with low cost price for the industrial culture of certain micro-organisms such as yeasts.

The subject of the present invention is also a method to convert into a culture medium giving by orientated biodegradation a fertilizer, petroleum products in the form of overfloating layers in which said products are sprinkled with a powder comprising 15 to 80 parts by weight of a substance ensuring the nutrition of the micro-organisms chosen amongst carbohydrates, proteins, ammonium salts, amines, amides and washes, 10 to 50 parts by weight of a substance reducing the surface tension chosen amongst the alkaline or alkaline-earth non toxic silicate, carbonate, phosphate, phosphite or hypophosphite and 150 to 400% by weight of the whole of the above two substances of an absorbing powder chosen amongst calcium carbonate and talcum powder.

There will be given in what follows, by way of non-limitative examples, different ways of putting the invention into practice.

EXAMPLE 1

A composition constituted by:

|  | Parts by weight |
| --- | --- |
| Molasses | 100 |
| Sodium silicate | 100 |
| Water | 100 | was prepared.

To 100 parts by weight of residues of heavy fuel No. 2, there were added 80 parts by weight of the above liquid composition and the mixture was stirred with the addition of 6000 parts by weight of soft water and 20 parts by weight of phosphoric acid and poured into a storage tank. After 5 weeks, checking by chromatography in the gaseous phase revealed a complete degradation of the hydrocarbons by natural micro-organisms. The aqueous suspension, after addition of nitrate and potash, was used for spraying sown cereals at the rate of 20 tonnes per hectare.

EXAMPLE 2

A composition constituted by:

|  | Parts by weight |
| --- | --- |
| Molasses | 100 |
| Calcium carbonate | 25 |
| Calcium silicate | 10 |
| Water | 100 |

100 parts by weight of petroleum residues, coming from Iraq, was emulsified by stirring with 60 parts by weight of the above liquid composition and there were added thereto 900 parts by weight of water.

After storing for 4 weeks, the emulsion was used to spray a river sand in which cereal had been sown, at the rate of 100 cm.$^3$ of solution per square metre.

The cereal sprouted normally.

EXAMPLE 3

A composition constituted by:

|  | Parts by weight |
| --- | --- |
| Molasses | 100 |
| Dibasic sodium phosphate | 10 |
| Calcium carbonate | 15 |
| Water | 10 | was prepared.

This liquid composition was used to emulsify the same quantity by weight of crude oil and there was added to the emulsion four times its weight of brackish water.

This emulsion was used immediately to spray a river sand at the rate of 100 grams per square metre. After six months, maize was shown in the treated sand and the maize developed normally.

EXAMPLE 4

A composition constituted by:

|  | Parts by weight |
| --- | --- |
| Molasses | 100 |
| Sodium silicate | 50 |
| Water | 50 | was prepared.

This pasty preparation was mixed weight for weight with crude oil recovered from beaches and the mixture was stored in a pit with the addition of 5 times the volume of sea water and of 0.5% nitric acid. After one year, checking by chromatography in the gaseous phase showed a complete degradation of the hydrocarbons and the product could be used as fertilizer.

EXAMPLE 5

A pasty preparation constituted by:

|  | Parts by weight |
| --- | --- |
| Molasses | 100 |
| Calcium carbonate | 60 |
| Calcium silicate | 6 |
| Water | 50 | was used as in Example 4. The fertilizer obtained was used, after addition of guano, as fertilizer for a poor, granitic soil.

EXAMPLE 6

A pasty composition constituted by:

|  | Parts by weight |
| --- | --- |
| Casein | 50 |
| Sodium silicate | 50 |
| Water | 100 | was prepared.

The composition was used to emulsify a bottom residue of a fuel oil tank with dilution with a volume of water equal to 10 times the volume of water. The mixture was stored in the open air for 6 weeks after which its pH was modified by addition of phosphoric and nitric acids to halt the degradation process. After evaporation of a part of the water, the liquid fertilizer proved to constitute an excellent fertilizer.

EXAMPLE 7

A pasty preparation constituted by:

|  | Parts by weight |
| --- | --- |
| Malt extract | 50 |
| Calcium carbonate | 20 |
| Sodium silicate | 50 |
| Water | 50 | was pumped into a double suction stirring pump at the same time as one and a half its weight of petroleum residues. The emulsion was diluted with brackish water and discharged into a lagoon without any harm to the flora and fauna.

There were also prepared other compositions corresponding to those above partially or totally replacing the molasses with powdered cellulose, finely ground sugar beet wastes and peptone and these compositions gave equivalent results. Likewise, for fertilizers intended for soils poor in ammonium, the salts were replaced totally or partially by mono- or dibasic ammonium phosphates.

EXAMPLE 8

A composition constituted by:

| | Parts by weight |
|---|---|
| Molasses | 20 |
| Sodium silicate at 35° Bé | 20 |
| Water | 20 | was prepared.

To 100 parts of this composition were added 40 parts by weight of hydrocarbons constituted by heavy petroleum residues and the mixture was stirred to give an emulsion which was diluted with about 15 times its volume of cheese factory serum.

Seven litres of this emulsion were poured into a ten-litre fermenter. The emulsion was innoculated with one gram of yeast of *Teruplopsis utilis* stock with suitable aeration and stirring. The yeast developed and after 10 hours, its weight corresponded to 53% of the weight of the molasses used. A check by chromatography in the gaseous phase showed a complete degradation of the hydrocarbons. The method could be carried out continuously compensating the degraded elements with application of the composition and hydrocarbon mixture.

EXAMPLE 9

A composition constituted by:

| | Parts by weight |
|---|---|
| Molasses | 25 |
| Natural potassium silicate (sanidine) | 30 |
| Water | 20 | was prepared.

100 parts by weight of this composition were used to emulsify 50 parts by weight of heavy hydrocarbons and to the emulsion was added about 15 times its volume of water.

A volume of ten litres of the emulsion was poured into a fifteen-litre fermenter and innoculated with one gram of silico-bacteria of the "Alexandrov" stock. After three weeks the silico-bacteria had proliferated. Decomposition of the natural potassium silicate and an amount of free potassium in the culture medium corresponding to 25% of the natural potassium silicate used were ascertained. A check by chromatography in the gaseous phase showed an advanced degradation of the hydrocarbon. The solution constituted a good fertilizer rich in potassium.

EXAMPLE 10

A composition constituted by:

| | Parts by weight |
|---|---|
| Molasses | 50 |
| Washes | 50 |
| Sodium silicate | 100 |
| Water | 100 | was prepared.

The composition was used in the same manner as in Example 1 but the complete degradation of the hydrocarbons was obtained after about three weeks.

EXAMPLE 11

A mixture comprising:

| | Parts by weight |
|---|---|
| Molasses | 25 |
| Washes | 25 |
| Sodium silicate at 35° Bé | 10 |
| Talcum powder | 150 | was mechanically stirred.

The powder obtained was used for sprinkling of petroleum overfloating at the surface of an aquarium. Petroleum was absorbed and carried along by the powder. The mixture deposited on the bottom of the aquarium has been progressively used up by the flora without any verifiable damage for flora and fauna.

EXAMPLE 12

A mixture comprising:

| | Parts by weight |
|---|---|
| Molasses | 40 |
| Urea | 10 |
| Calcium silicate | 5 |
| Calcium carbonate in powdery form | 150 | was mechanically stirred.

This powdery mixture was used in the same manner as in Example 11 with the same result.

EXAMPLE 13

A mixture comprising:

| | Parts by weight |
|---|---|
| Molasses | 20 |
| Washes | 20 |
| Calcium silicate | 4 |
| Calcium carbonate | 130 |
| Stearic acid | 24 | was mechanically stirred.

The amount of said powdered product to be used, in the same manner as in Example 12 to absorb the petroleum was reduced by about 40%.

EXAMPLE 14

A mixture comprising:

| | Parts by weight |
|---|---|
| Molasses | 20 |
| Washes | 20 |
| Sodium silicate 35° Bé | 8 |
| Talcum powder | 130 |
| Oleic acid | 20 | was mechanically stirred.

The powder obtained was used in the same manner as in Example 13 with fairly the same results.

The embodiments described above by way of example are capable of receiving numerous modifications without departing from the scope of the present invention.

What is claimed is:

1. A method of accelerating the biodegradation of petroleum products by microorganisms selected from the group consisting of yeast, bacteria and fungi comprising the steps of:
    mixing 100 parts by weight of the petroleum products to be biodegraded with 50 to 250 parts by weight of a composition consisting essentially of 15 to 80 parts by weight of a substance for nourishing microorganisms and selected from the group consisting of molasses, cellulose, sugar beet waste, casein, malt extract, proteose, ammonium salt, amine, amide and residuary liquor obtained when distilling fermented molasses in alcohol manufacture, 10 to 50 parts by weight of a salt whose cation is selected from the group consisting of calcium, sodium, ammonium and potassium and whose anion is selected from the group consisting of phosphate and silicate and 5 to 60 parts by weight of water, and
    forming an emulsion of the mixture thus produced with water in an amount from 5 to 40 times by weight of the mixture.

2. A method of accelerating the biodegradation of petroleum products floating on the surface of a body of water by natural microorganisms living in said water comprising the step of sprinkling the petroleum products to be biodegraded with a composition consisting essentially of:
- 15 to 80 parts by weight of a substance for nourishing microorganisms and selected from the group consisting of molasses, cellulose, sugar beet waste, casein, malt extract, proteose, ammonium salt, amine, amide and residuary liquor obtained when distilling fermented molasses in alcohol manufacture,
- 10 to 50 parts by weight of a salt whose cation is selected from the group consisting of calcium, sodium, ammonium and potassium and whose anion is selected from the group consisting of phosphate and silicate,
- 150 to 400 parts by weight of an absorbing powder selected from the group consisting of calcium carbonate and talcum powder, and
- 10 to 30% by weight of said absorbing powder of a fatty acid selected from the group consisting of stearic, oleic and palmitic.

References Cited

Berkman et al.: Emulsions & Foams, Reinhold Pub. Corp. (1941), pp. 171–2, 178–184.

JOHN D. WELSH, Primary Examiner

U.S. Cl. X.R.

195—3H; 210—11